United States Patent Office 2,945,567
Patented July 19, 1960

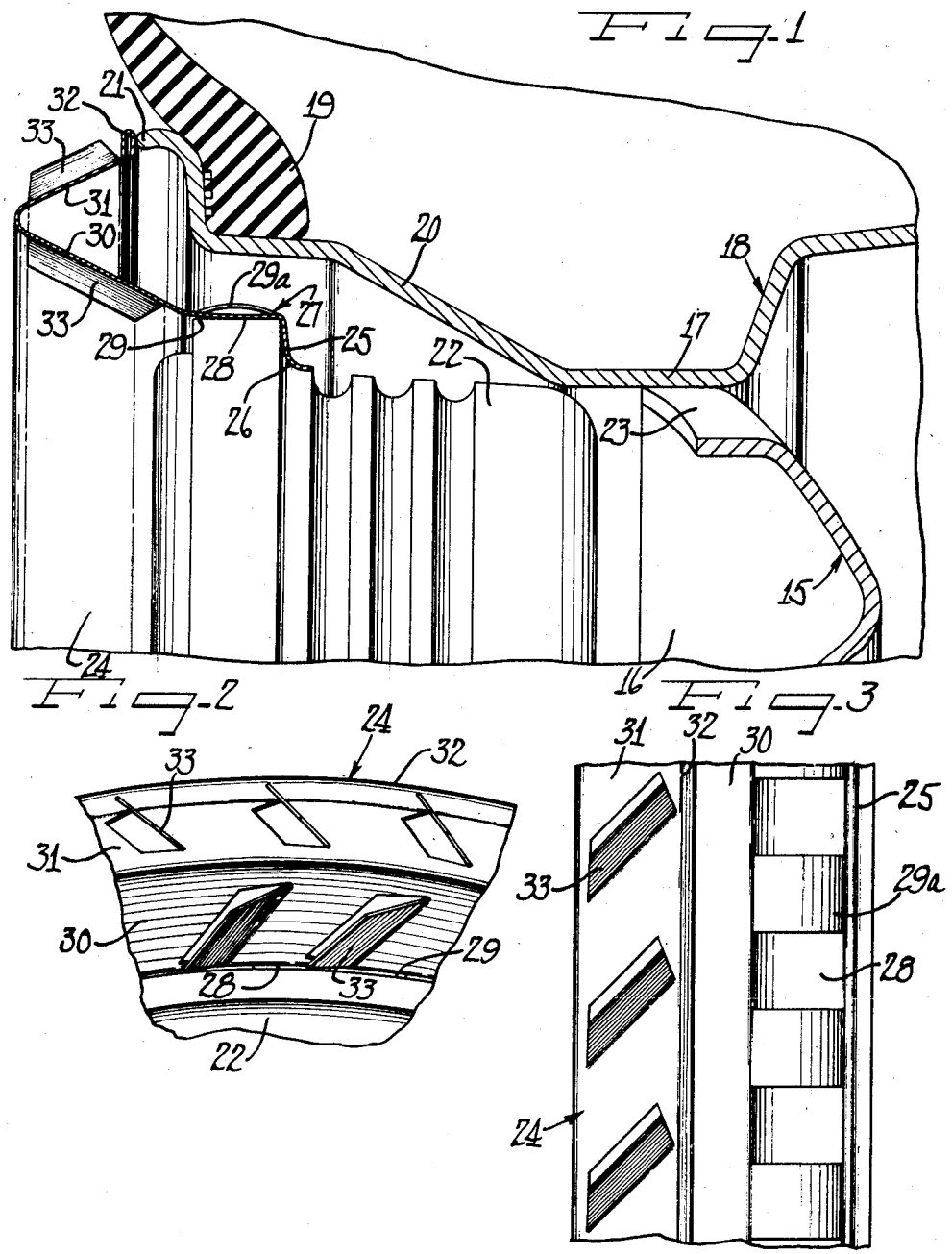

2,945,567

WHEEL STRUCTURE WITH BRAKE DRUM COOLING MEANS

George Albert Lyon, 13881 W. Chicago Blvd., Detroit, Mich.

Filed July 22, 1955, Ser. No. 523,756

10 Claims. (Cl. 188—264)

The present invention relates to improvements in wheel structures and more particularly concerns improved means for cooling the brake drums associated with vehicle wheels.

An important object of the present invention is to provide improved means for retaining a cooling ring on a wheel.

Another object of the present invention is to provide an improved wheel structure having novel means for cooling a brake drum associated with the wheel.

Another object of the invention is to provide a novel brake drum cooling device having means to positively position the ring with relation to the brake drum and the tire rim.

A still further object of this invention is to provide a cooling ring construction which lends itself to economical manufacture on a large production basis.

Another and further object of this invention is to provide improved cooling ring means for use with a wheel including a brake drum.

Other objects, features and advantages of the present invention will become more readily apparent from the following detailed description of the accompanying drawing illustrating a single embodiment thereof, in which:

Figure 1 is a fragmentary radial sectional view, partly in elevation, of a vehicle wheel assembly embodying features of the invention;

Figure 2 is an enlarged fragmentary side elevational view of the cooling ring of Figure 1; and Figure 3 is an enlarged fragmentary plan view of the cooling ring seen in Figure 1.

As shown on the drawings:

Referring now to Figures 1, 2 and 3, a wheel with which the present invention is particularly useful comprises a wheel body 15 of the disk spider type having an outer marginal axially inwardly directed flange 16 secured in any suitable manner to a base flange 17 of a tire rim 18. The tire rim is of the multi-flange, drop center type adapted to support a tubeless tire assembly 19.

In order to accommodate the large size of the tire 19, the tire rim has a generally radially inwardly and axially outwardly angled inner flange 20 of substantial width terminating in a generally radially outwardly and then axially inwardly turned terminal flange 21. It will be appreciated that by reason of the substantial width of the tire rim, the inner tire rim flange 20 completely encompasses a brake drum 22 which is mounted on the wheel axle (not shown) to which the wheel is attached in assembly by means of the usual attachment bolts (not shown). In addition there is a gap between the brake drum 22 and the tire rim flange 20, as shown, communicating with the wheel openings 23 between the wheel body and the tire rim flange 17. By reason of the encirclement of the brake drum by the tire rim, the air in the gap between the brake drum and the tire rim is liable to stagnation especially in high speed operation of the vehicle. This is especially true since the brake drum is, by the shielding effect of the tire rim and the tire, precluded from the direct effect of slip stream air, thereby increasing the possibility of overheating the brakes.

The present invention concerns itself with providing effective means for positive movement of the air into the gap between the tire rim and the brake drum 22 for cooling same. The instant means constitutes a cooling ring 24 which is preferably made from sheet material and may be formed as a stamping or as a rolled section.

At its axially outer margin the ring is provided with an annular generally axially inwardly and radially outwardly directed portion 25 capable of closely hugging a complementarily formed surface 26 on the brake drum to provide a stop for limiting axial inward displacement of the ring 24 in assembly.

Joined with the annular portion 25 is annular member 27 which has about its circumference a plurality of resilient radially inwardly extending struck-out drum gripping strip or slit portions 28 alternating with a plurality of struck-out back-up strip or slit portions 29a for reinforcing portions 28 and which portions 28 and 29a are bent or arched in radially opposite directions when engaged with the brake drum.

The brake drum 22 is provided with an annular relatively flat surface 29. This surface 29 is of a slightly larger diameter than the drum gripping portions 28 so that when they are assembled, a tensioned snap-on pry-off engagement may be effected.

Provided on the axially inner end of the portion 27 is a generally axially inwardly and radially outwardly extending portion 30 connected at its other end to a generally axially and radially outwardly extending portion 31 terminating in a curled or beaded abutment 32. This abutment 32 is adapted to overlie and preferably engage resiliently under tension with the tip of the terminal flange 21 to preclude axially outward displacement of the ring in assembly.

Located on the diverging portions 30 and 31 are a plurality of circumferentially spaced struck-out air louvers 33 capable of directing air into the gap between the rim 18 and the brake drum 22 to cool same. The louvers 33 are, of course, flared toward mouths that open in the direction of rotation of the ring 24. Furthermore, each of the louvers is preferably tapered toward a smaller trailing end removed from the sides or legs of the louvers and from the top so that each louver will function to scoop air not only along its axially inner side or wall but also on its radially inner and outer sides.

It will be appreciated that the air cooling ring may be supported entirely free of the tire rim.

In assembly of the ring 24 on the brake drum 22, the ring is axially aligned with the brake drum and thereafter urged axially inwardly into retaining engagement. That is, the struck-out portions 28 or more particularly, the intermediate resiliently deflectable areas disposed therebetween the opposite ends of the portions 28 engage with the annular surface 29 with the stop portion 25 engaging the complementary brake drum surface 26. The portions 28 and 29a when engaged with the brake drum are arched in radially opposite directions with respect to one another. The wheel assembly is then mounted on the axle (not shown). In assembled relationship, the tire rim will bear against the bead 32 to limit axially outward displacement of the ring.

From the foregoing it will now be appreciated how a highly advantageous economical cooling ring may be integrally manufactured in one piece.

It will be understood that modifications and variations may be effected without departing from the scope of the novel concepts of the present invention.

I claim as my invention:

1. A brake drum cooling ring for encircling the base of the brake drum to stimulate air flow about the brake drum having annular diverging portions each having circumferentially spaced protruding louvers for promoting air circulation through the ring, and resilient spring means on the ring to maintain the ring in detachable assembly with the brake drum.

2. A brake drum cooling ring for encircling the base of the brake drum to stimulate air flow about the brake drum having annular diverging portions each having circumferentially spaced protruding louvers for promoting air circulation through the ring, and resilient spring means on the ring to maintain the ring in detachable assembly with the brake drum, said means comprising alternating, protruding and back-up portions with the protruding portions being normally of a smaller diameter than an outside surface of the brake drum for detachable assembly therewith.

3. In a wheel structure including a brake drum with a stepped area having an axially outwardly facing area and a radially outwardly facing area and a multi-flanged stepped tire rim overlying the brake drum and having a terminal rim flange, a cooling ring structure overlying the tire rim and having a resiliently deflectable inner margin retainingly cooperable with the stepped area, said inner margin being stepped and deflectable into and out of engagement with the stepped area of the brake drum and with the inner margin having circumferentially spaced axial slits defining strip portions between the slits and with every other strip portion being in retaining engagement with the radially outwardly facing area on the brake drum, said ring having an outer margin including an outer marginal flange abutted against the tire rim, an annular intermediate ring body portion disposed between and connecting the inner margin with the outer margin which body portion includes junctioned ring portions diverging axially outwardly from their junction toward the inner margin and outer margin, and circumferentially spaced air louvers on the intermediate diverging ring portions for aiding in the circulation of air through the ring to cool the brake drum.

4. In a wheel structure including a brake drum with a stepped area having an axially outwardly facing area and a radially outwardly facing area and a multi-flanged stepped tire rim overlying the brake drum, a cooling ring structure overlying the tire rim and having an inner margin retainingly cooperable with the stepped area, said inner margin being stepped and deflectable into and out of engagement with the stepped area of the brake drum and with the inner margin having circumferentially spaced axial slits spaced axially from the inner edge of the ring defining strip portions between the slits and with every other strip portion being in retaining engagement with the radially outwardly facing area on the brake drum, said ring having an outer margin including an outer marginal flange abutted against the tire rim, and air louver structure on the ring between its margins for aiding in the circulation of air through the ring to cool the brake drum.

5. In a wheel structure including a brake drum with a stepped area having an axially outwardly facing area and a radially outwardly facing area and a multi-flanged stepped tire rim overlying the brake drum and having a terminal rim flange, a cooling ring structure overlying the tire rim and having a resiliently deflectable retaining structure at its radially inner margin retainingly cooperable with the stepped area, said ring having a radially outer margin including a radially outer marginal flange abutted against the terminal rim flange, an annular intermediate ring body portion disposed between and connecting the radially inner margin with the radially outer margin which body portion includes junctioned ring portions diverging axially outwardly from the junction toward the radially inner margin and radially outer margin, and circumferentially spaced air louvers on the diverging portions for aiding in the circulation of air through the ring to cool the brake drum.

6. In a wheel structure including a brake drum with a stepped area having an axially outwardly facing area and a radially outwardly facing area and a multi-flanged stepped tire rim overlying the brake drum and having an axially outwardly extending terminal rim flange, a cooling ring structure overlying the tire rim and having a resilient retaining structure at its radially inner margin retainingly cooperable with the brake drum, said ring having a radially outer margin including a radially outer marginal flange abutted against the axially outwardly extending terminal rim flange, an annular intermediate ring body portion disposed between and connecting the radially inner margin with the radially outer margin which body portion includes ring portions junctioned at their axially inner ends and which are inclined and diverge axially outwardly from the junction toward the radially inner margin and radially outer margin, and circumferentially spaced air louvers on the diverging portions for aiding in the circulation of air through the ring to cool the brake drum.

7. In a wheel structure including a brake drum with a stepped area having an axially outwardly facing area and a radially outwardly facing area and a multi-flanged stepped tire rim overlying the brake drum and having a terminal rim flange, a cooling ring structure overlying the tire rim and having a resiliently deflectable inner margin retainingly cooperable with the stepped area, said inner margin being stepped and deflectable into and out of engagement with the stepped area of the brake drum and with the inner margin having circumferentially spaced axial slits defining strip portions between the slits and with every other strip portion being in retaining engagement with the radially outwardly facing area on the brake drum, said ring having an outer margin including an outer marginal flange abutted against the tire rim, an annular intermediate ring body portion disposed between and connecting the inner margin with the outer margin which body portion includes junctioned ring portions diverging axially outwardly from their junction toward the inner margin and outer margin, and circumferentially spaced air louvers on the intermediate diverging ring portions for aiding in the circulation of air through the ring to cool the brake drum, the slits being co-extensive in length with the radially outwardly facing area and with the strip portions free of the radially outwardly facing area being arched away from and backing up the adjacent strip portions engaged against the drum.

8. In a wheel structure including a brake drum having a generally radially outwardly directed face, a cooling ring having an inner ring margin overlying and encircling the face of the brake drum and having radially inwardly struck-out resiliently deflectable retaining portions extending from said margin for removable engagement with the face to retain the ring against radial displacement, said struck-out retaining portions being spaced from an inner marginal edge of the ring margin and with each retaining portion having axially opposite ends which are secured at said opposite ends with the ring, said retaining portion having a resiliently deflectable area between the opposite ends for tensioned engagement with the face of the brake drum.

9. In a wheel structure including a brake drum having a generally radially outwardly directed face, a cooling ring having an inner ring margin overlying and encircling the face of the brake drum and having radially inwardly resiliently deflectable back-up and retaining strip portions extending from said margin, the back-up and retaining strip portions being bent in radially opposite directions with respect to one another, the retaining strip portions being adapted for removable engagement with the face to retain the ring against radial displacement, said strip portions being spaced from an inner marginal edge of the ring margin and with each portion having axially opposite ends which are secured at said opposite ends with the ring, said retaining strip portions having a resiliently deflectable area between the ends for tensioned engagement with the face of the brake drum.

10. A cooling ring for cooling the wheel brake drum having one of its ring margins provided with resiliently deflectable strip retaining portions extending radially from said ring for removable engagement to retain the ring in assembly with a vehicle, said strip retaining portions being spaced from a marginal edge of the ring and with each retaining portion having axially opposite ends which are secured at said opposite ends with the ring, said portions having a resiliently deflectable area between the ends for tensioned retaining engagement with the wheel brake drum.

References Cited in the file of this patent

UNITED STATES PATENTS

| | | |
|---|---|---|
| 1,320,551 | Holley | Nov. 4, 1919 |
| 1,835,601 | Joyce | Dec. 8, 1931 |
| 2,808,909 | Lyon | Oct. 8, 1957 |

FOREIGN PATENTS

| | | |
|---|---|---|
| 495,501 | Canada | Aug. 25, 1953 |